(12) United States Patent
Gurin

(10) Patent No.: US 11,695,276 B2
(45) Date of Patent: Jul. 4, 2023

(54) FEEDFORWARD DYNAMIC AND DISTRIBUTED ENERGY STORAGE SYSTEM

(71) Applicant: Michael Gurin, Glenview, IL (US)

(72) Inventor: Michael Gurin, Glenview, IL (US)

(73) Assignee: Michael Gurin, Glenview, IL (US)

( * ) Notice: Subject to any disclaimer, the term of this patent is extended or adjusted under 35 U.S.C. 154(b) by 231 days.

(21) Appl. No.: 17/308,902

(22) Filed: May 5, 2021

(65) Prior Publication Data

US 2021/0257838 A1    Aug. 19, 2021

Related U.S. Application Data

(63) Continuation-in-part of application No. 16/398,264, filed on Apr. 30, 2019, now Pat. No. 11,011,909.

(51) Int. Cl.
*H02J 3/32* (2006.01)
*G05B 6/02* (2006.01)
*H02J 50/00* (2016.01)
*H02J 13/00* (2006.01)

(52) U.S. Cl.
CPC ................ *H02J 3/32* (2013.01); *G05B 6/02* (2013.01); *H02J 50/00* (2016.02)

(58) Field of Classification Search
CPC ........ H02J 3/32; H02J 50/00; H02J 13/00026; H02J 2203/10; G05B 6/02; Y02B 90/20; Y02E 40/70; Y02E 60/00; Y04S 10/14; Y04S 10/50; Y04S 20/00; Y04S 40/126
USPC ........................................................ 700/291
See application file for complete search history.

(56) References Cited

U.S. PATENT DOCUMENTS

| | | | |
|---|---|---|---|
| 11,011,909 B1 * | 5/2021 | Gurin | H02J 1/14 |
| 2014/0232332 A1 * | 8/2014 | Feuerstack | H02J 50/12 |
| | | | 320/108 |
| 2018/0060713 A1 * | 3/2018 | Thueringer | G06K 19/0723 |

* cited by examiner

*Primary Examiner* — Michael J Brown

(57) ABSTRACT

A system and method for energy distribution leveraging dynamic feedforward allocation of distributed energy storage using multiple energy distribution pathways to maximize load-balancing to accelerate return on investment, reduce system energy consumption, and maximize utilization of existing energy infrastructure particularly for modular construction.

20 Claims, 9 Drawing Sheets

Types of 1000 Modules
Ballasted Furniture
Wall Panel or Pocket Door
Nested Seat or Table
Ballasted Light Fixture or Speaker

Parameters of 990.1
Flow Rate
Threshold - Electrical - Current or Voltage
Threshold - Thermal - Temperature or Flow Pathway Rating - Electrical Wire - Current or Voltage
Pathway Rating - Thermal - Temperature or Pressure

FEEDFORWARD DYNAMIC AND DISTRIBUTED ENERGY STORAGE SYSTEM

CROSS-REFERENCE TO RELATED APPLICATIONS

This patent application claims priority from U.S. patent application Ser. No. 16/398,264 titled "Feedforward Dynamic and Distributed Energy Storage System" on Apr. 30, 2019, the content of which is incorporated by reference.

FIELD OF INVENTION

The present invention relates to an energy storage system, whether the energy is electrical or thermal, with coordinated charging and discharging via a feedforward control system through at least energy flow pathways to minimize system installed cost while maximizing energy efficiency. The implementation of the inventive system is of particular importance in modular construction, 3d-printed buildings, and hyper-energy efficient buildings.

BACKGROUND OF INVENTION

Prior art includes the stationary placement of energy storage system(s) within a utility electric grid or within buildings for decoupling power generation from power consumption, such as in particular the creation of intermittent renewable energy (e.g., solar, wind) producers. The integration of particularly solar panels into buildings of all types are done solely in an incremental manner along with the energy storage system. This method has minimal impact in reducing the costs of total building systems, in fact in all cases the total building system cost is higher with the energy storage system than without it.

Prior art within modular construction, as well as 3d-printed buildings, are particularly sensitive to the cost of energy interconnects (e.g., electricity, hot-water, cold-water, etc.). The high-peak demand of energy consumers leads to substantially over-sizing of virtually all energy production and transmission equipment, that leads to a corresponding increase in upfront capital costs having a bigger impact in modular construction though in fact in virtually all types of building construction.

Other prior art includes solely distributed stationary energy storage systems in which the charging and discharging takes place at the same location and therefore solely realizes the time differential between peak and off-peak rate structures without having any secondary benefits or increase in utilization factors. In fact, this scenario doesn't even bypass the distribution lines of the traditional energy distribution components therefore leading predominantly to a traditional once a day peak to off-peak offset.

Advances in technology have changed the way construction has taken place, such as a shift to modular and pre-fabricated assembly though it is almost exclusively structural in nature. However, the design of buildings has not changed substantially to truly leverage and take advantage of energy distribution advances such as advance energy storage, wireless power, and other advance materials and solid-state electronics capabilities. Therefore, modular construction has only incrementally reduced the cost of construction and systems leveraging the new technologies actually increase the capital cost of the total system solution rather than reduce capital costs.

A need for an energy storage system that greatly enhances load-balancing WHILE reducing system installed capital costs and reducing the operating costs of energy consumption is required to accelerate the adoption of energy efficiency measures and further accelerate the implementation of renewable energy and reduced environmental foot-print of modular construction well beyond the existing adoption rate.

SUMMARY OF INVENTION

The present invention is a distributed and decoupled energy storage system from both a first power transmission for power delivery from local power generating sources and remote power generating sources whether the remote sources are in relatively close proximity as a micro-grid or in a centralized utility within a modular system (typically a building though also anticipated as a non-stationary vehicle as well) optimized to reduce upfront capital costs through a series of high energy consumers having directly coupled energy storage devices within a second energy pathway isolated from the first energy pathway where the energy consumer has an integral power regulator (or immediately external of the integral power regulator) that blends the power supply from both the first and second energy pathway concurrently.

Another object of the invention is to minimize the levelized cost of energy where the installation of a modular building has a substantially reduced energy transmission capital cost and installation cost by downsizing the energy transmission pathway power rating by leveraging the strategic and distributed placement of energy storage devices with high peak demand energy consumers (and not inherently located with energy consumers having high energy consumption).

Yet another object of the invention is to enable easy access to energy storage devices by integrating the energy storage devices with pocket doors or swinging doors hidden by covers with integral directional air flow in which ion wind generators leverage the high surface area of the energy storage devices to maximize convective heat transfer yet remaining virtually silent due to the lack of mechanical air flow methods.

Another object of the invention is to co-locate energy recovery devices, as well as water recovery devices, to both increase energy efficiency and decrease energy flow through the segmented energy transmission pathway.

A further object of the invention is to minimize the initial embedded $CO_2$ footprint of the modular building while incrementally decreasing both energy consumption directly while sequestering $CO_2$ from atmospheric air. Standalone $CO_2$ removal from atmospheric air has no payback without subsidy or taxation, as compared to this embodiment in which removal of $CO_2$ from indoor air enables a direct reduction of makeup fresh-air with the accompanied thermal losses due to venting of indoor air due to respiration from breathing beings.

Yet another object of the invention is to embed energy storage within a modular panel increasing the surface area in combination with an intermittent operation of a solid-state ion wind generator to enhance convective air transfer where one of the electrodes of the ion wind generator also serves as a thermal heat spreader for the energy storage device.

Yet another object of the invention is leveraging a feedforward energy transmission controller concurrently with a feedback energy regulator of an energy consumer to leverage the strategic location of decoupled energy storage devices.

Another object of the invention is to use the unique combination of daisy chained modular panels with integral and embedded daisy chained though segmented and isolated yet interconnected energy transmission pathways to reduce cost of modular construction, notably best achieved with low voltage electricity.

All of the aforementioned features of the invention fundamentally recognize the distinction of a decoupled energy storage system that leverages the gains realized by integrating in a decentralized manner and providing multiple concurrent supplies of energy to energy consumers especially within buildings leveraging modular construction designs.

DEFINITIONS

Figure 1:
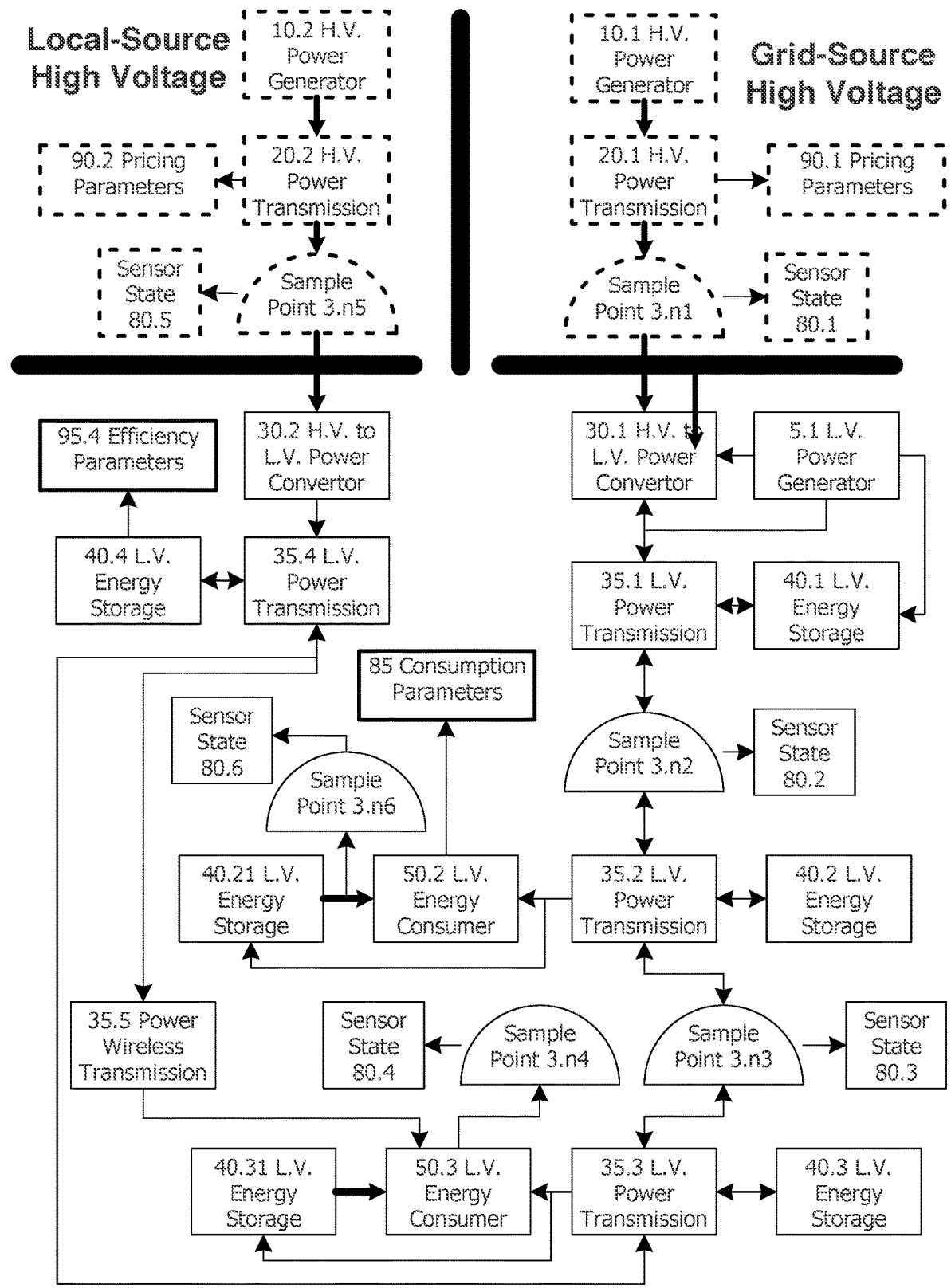
FIG. 1 is an energy flow diagram of the modular distributed energy storage system.

The term "energy storage" is a material that stores energy, whether it be thermal or electrical, such that the primary production of the stored energy form "primary energy" is directed into the energy storage via charging and is subsequently at a non-concurrent time discharged for ultimate end-use consumption of the stored energy subsequent. The transferring of the primary energy as stored energy (i.e., charged media) from the energy storage location to another device to decouple the ultimate consumption of the primary energy at a second location occurs at a "repowering station" hereinafter also abbreviated as "RS".

The term return on investment "ROI", as known in the financial art, is deficient for most energy storage technologies as the payback is too long in comparison to many entities payback threshold as energy storage devices and therefore their payback is limited due to the number of charging and discharging cycles required or able to be provided on a daily basis (and even then most utilities only have a 5-day period in which a peak and off-peak differential occurs).

The term "feedforward and feedback loop control system" is the combination of controlling components (i.e., energy storage components and energy distribution lines) first using a feedforward control system immediately followed by a feedback control system such that control parameters of the feedback control system are a function of the feedforward control system. For clarity, it is understood that the term control system is at least a feedback loop control system and preferably a feedforward and feedback loop control system.

DETAILED DESCRIPTION OF INVENTION

Here, as well as elsewhere in the specification and claims, individual numerical values and/or individual range limits can be combined to form non-disclosed ranges.

Exemplary embodiments of the present invention are provided, which reference the contained figures. Such embodiments are merely exemplary in nature. Regarding the figures, like reference numerals refer to like parts.

The invention significantly increases the daily cycles of charge/discharge in order to reduce the time duration required to achieve a financial return not only at the component level but most importantly at the system level.

Turning to FIG. 1, FIG. 1 depicts the interconnection within a modular building as well as the external interconnections from a locally co-located "local-source high-voltage" or "LSHV" energy source and/or a centralized (i.e., not co-located) "grid-source high-voltage" or "GSHV" energy source. It is understood that the LSHV can be in close physical proximity such as a power source within the industry accepted term of microgrid or in fact an on-the-building energy source such as rooftop solar panels. It is understood that the GSHV is more typical of a traditional utility supplied power source. Yet in this embodiment the fundamental importance is that multiple concurrent energy feed sources are present, and more importantly due to the fundamental objective of minimizing energy transmission ratings through distributed energy storage with interruptible transmission segments the multiple energy sources are at different ends of the energy transmission pathway. It is further understood, though represented as electricity, the energy transmission pathway is also anticipated to be thermal energy such as via a heat-transfer fluid or a thermal bus.

Beginning at the GSHV 10.1 H.V. power generator provides energy through a 20.1 H.V. power transmission line. The power generator source has 90.1 pricing parameters as known in the art that can range from peak vs. off-peak, real-time, more traditional time of day, or even firm non-dynamic pricing. The energy flow is through a 3.$n$1 sample point providing a 80.1 sensor state (e.g., kW or BTU). Likewise, the LSHV 10.2 H.V. power generator provides energy through a 20.2 H.V. power transmission line. The power generator source has 90.2 pricing parameters as known in the art that can range from peak vs. off-peak, real-time, more traditional time of day, or even firm non-dynamic pricing. The energy flow is through a 3.$n$5 sample point providing a 80.5 sensor state (e.g., kW or BTU).

The GSHV, which when electrical is at a different voltage (and in fact most likely AC, as opposed to DC), the energy source is converted through a 30.1 H.V. power convertor (or when thermal instead of electrical interchanged with a thermal regulator which can be a high-pressure steam to low-pressure steam modulator valve, pressure reducer, or energy generating pressure expander). The same power convertor can regulate directly another connected to a co-located 5.1 L.V. power generator (e.g., a solar panel on a DC bus) though electrically isolated with independent regulation/control as known in the art. Since in this embodiment it is critical to reduce the energy transmission capacity rating, it is a feature of the 5.1 L.V. power generator to directly connect to the 40.1 L.V. energy storage and concurrently isolate all energy flow from the 35.1 L.V. power transmission. Though not shown, it is understood that excess energy generated via 5.1 L.V. power generator (e.g., biofuel powered plant, solar, wind, hydro, etc.) can be sold into the GSHV utility grid or LSHV micro-grid. It is imperative within the inventive system that every segment of the 35.*x* power transmission system have an 3.*nx* energy sampling point providing a 80.*x* sensor state to the 3204 transmission control engine "controller" (as shown on FIG. 2) to regulate/switch both the direction and quantity of energy flowing through and between each of the transmission pathways. A transmission pathway is by definition segmented into individual, though interconnected through isolation regulators/switches also referred to as an isolation connector or isolation switch or isolation point used interchangeably, pathways in which at least one power generator or energy storage source is present such as from 35.1 L.V. power transmission segment to 35.2 L.V. power transmission where a 3.*n2* sample point provides a 80.2 sensor state (and though not shown in this figure an energy isolation capability between the two segments that modulates energy flow from energy each source including direction of flow. In this instance, the second segment of the 35.2 L.V. power transmission has an 40.2 L.V energy storage within the segment itself capable of providing (as known in the art) directly to the transmission pathway. This same 35.2 L.V. power transmission is directly connected to the 50.2 L.V. energy consumer, such that power in this instance as depicted can come from all interconnected sources (as dynamically available at such time) BUT most importantly as a design feature of the invention from an immediately co-located 40.21 L.V. energy storage device that DOESN'T have any energy flow through any (as shown 35.2 L.V.) power/energy transmission segment. The flow of energy from that isolated and directly connected through a second energy flow pathway to the 50.2 L.V. energy consumer is also regulated by the 3204 transmission control engine (as shown on FIG. 2) as 3.*n6* sampled through 80.6 energy state. The 3204 transmission control engine has specifications of the 50.2 L.V. energy consumer including 85 consumption parameters (understood to be available for as many energy consumers or aggregated energy consumers as possible) that further include historic, projected, scheduled, and dynamic modeled data-points to ensure that each segment of the power transmission is maintained below its maximum thresholds. As described earlier, each pathway having either a power generator or energy storage capability has regulator at the interconnection point with a 3.*n3* sampling point providing a 80.3 sensor state (and also respectively 3.*n4* and 80.4 for 50.3 L.V. energy consumer since the energy consumer has an independently connected energy source transmitted via 35.5 wireless power transmission methods (as known in the art) which by design doesn't use or therefore place a demand on any independently and isolated power transmission methods to the 50.3 L.V. energy consumer. Each energy source to the consumer, even if it is at precisely the same operating voltage, is isolated and independently regulated/constrained to maintain each physical wire of power transmission to below its maximum operating threshold. This embodiment depicts a concurrent wireless and "wired" power source into the 50.3 energy consumer. It is understood as shown that the 35.5 power wireless transmission, though potentially less energy efficient, may draw power from 40.4 L.V. energy storage through a wired 35.4 L.V. transmission segment so as to not place a transmission constraint on the wired pathway (or draw power through one portion of the segmented power transmission, as shown to be 35.4 L.V. sourced ultimately from 10.2 H.V. power generator. Though shown for only 40.4 L.V. energy storage, it is understood that each energy storage device is fully characterized by 95.4 efficiency parameters that include other operating parameters and design limitations such as in-out energy efficiency, maximum charge and discharge rates, cumulative deep discharge cycles, cycle lifetime, operating temperature, and ultimately the levelized cost of energy for each energy storage system (at least that portion attributed to energy flow amortization rate).

Figure 2:
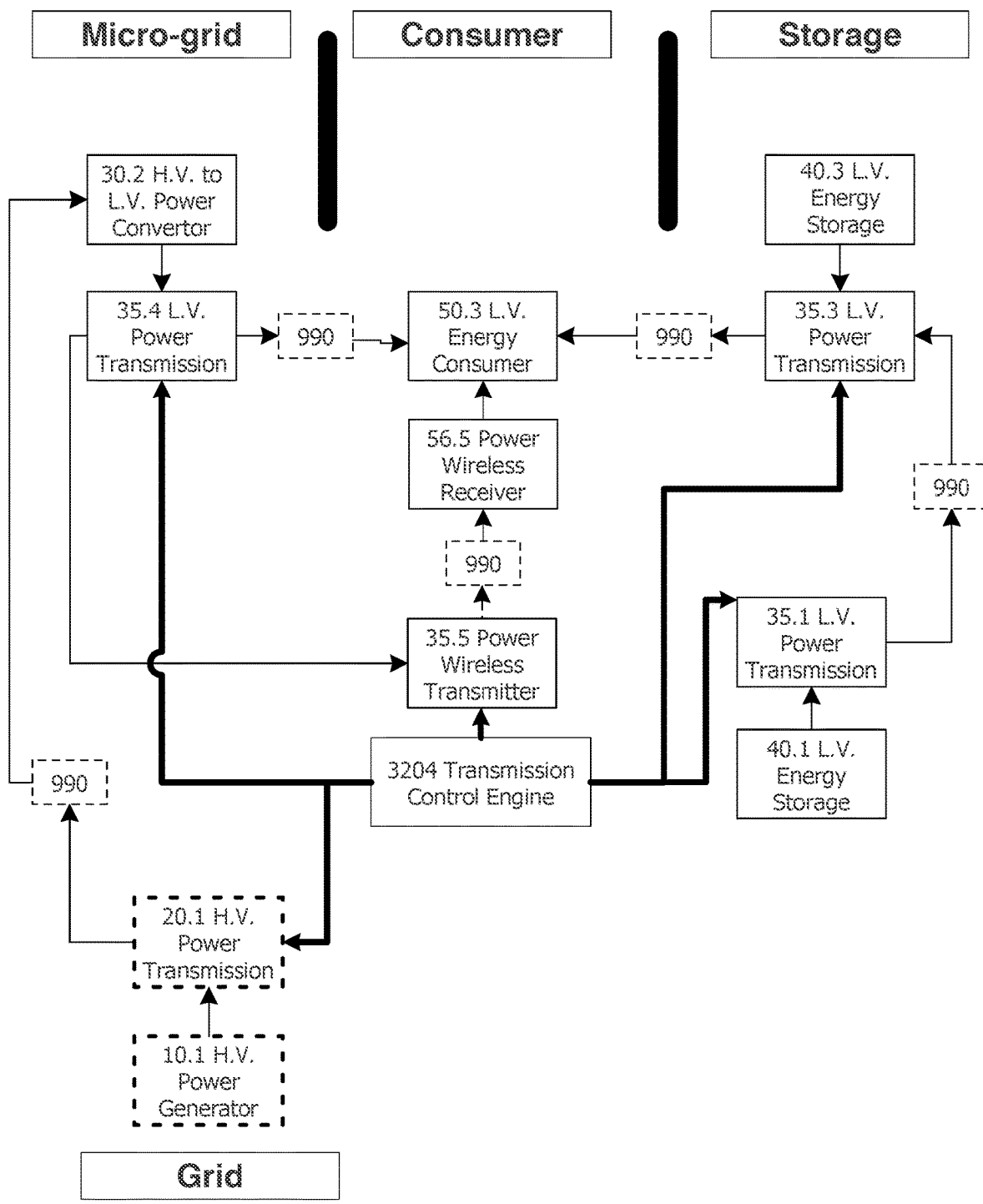
FIG. 2 is also an energy flow diagram with additional detail of multiple energy pathways to the energy consumer.
Figure 3:
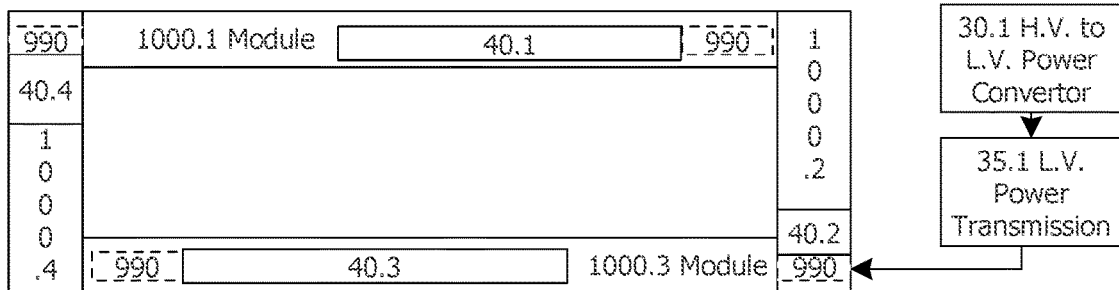
FIG. 3 is a top view depicting multiple interconnected modules, an interior side view within an exemplary module, and a component and flow view detail of a thermal energy storage exemplary system.
Figure 3:
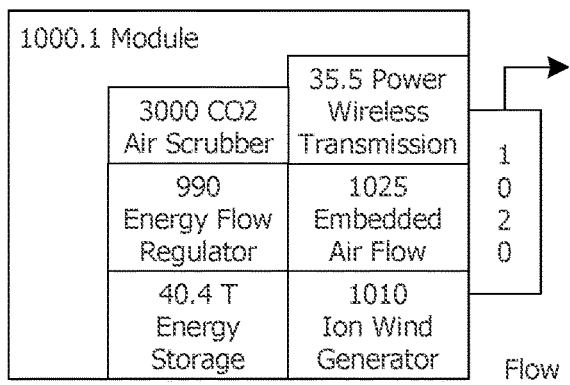
Figure 3:
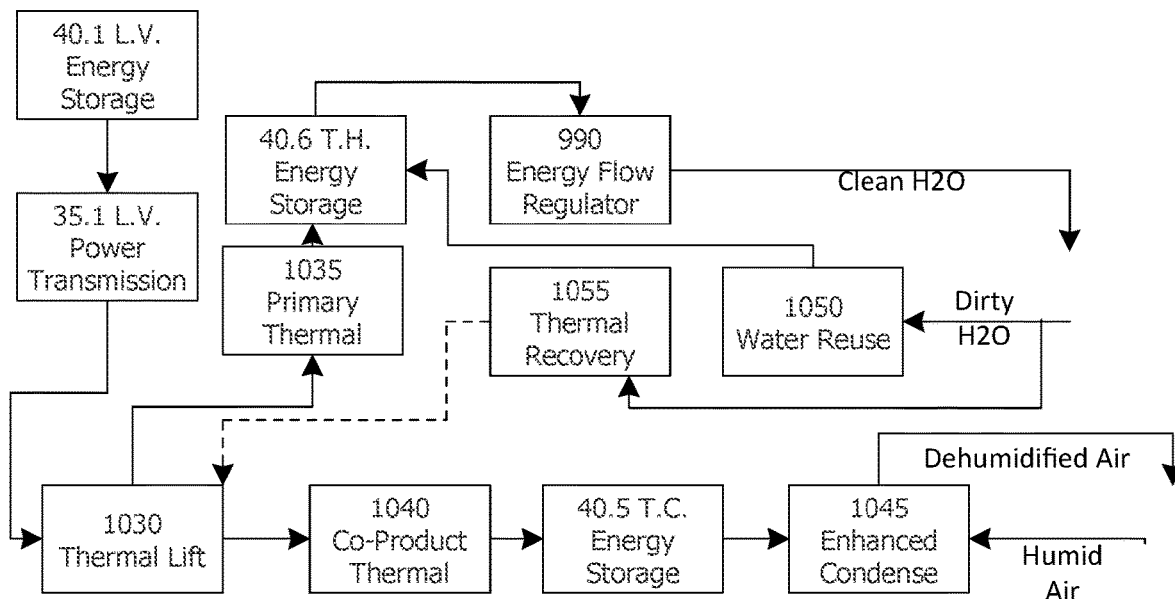

Turning to FIG. 2, FIG. 2 is a more detailed version of FIG. 3 in which the 990 voltage regulators also with embedded energy circuit isolation and modulated (preferably variable energy flux modulation, though also can be binary open/close) flow regulation. In addition, the 3204 transmission control engine "controller" is in communications (whether it be wired or wireless as known in the art) with each segment of the power transmission (as shown 35.1 L.V., 20.1 H.V., 35.1 L.V., 35.2 L.V., and 35.3 L.V.) via sample points and sensor states (as shown in FIG. 1). As noted earlier, the most important aspect of the invention is the 50.3 L.V. energy consumer has at least two independent, isolated, and regulated energy sources such that each energy source energy pathway is segmented from the others and that the 3204 controller dynamically modulates the system energy flow with a primary emphasis on maintaining no more than 98% of total consumer energy from an individual wired power transmission (35.4 L.V. or 35.3 L.V.) and preferably no more than 50% of total consumer energy from an individual wired power transmission, and more specifically preferred that the power transmission rated capacity is no more than 20% of the peak power rating of the 50.3 L.V. energy consumer.

The dynamic and distributed energy storage system has virtually all aspects of energy transmission coordinated by a controller. The controller has computer memory, as known in the art, such that at least a portion the memory is non-transitory memory. Memory is utilized to coordinate through a reservation engine individual charge and discharge transactions that are configured, scheduled, and dispatched in a time series interval of at least one charge reservation and at least one discharge reservation for each of the networked individual energy storage devices. The reservation engine also links the individual energy storage devices to at least one energy consumer that is directly co-located or at least in energy communications with at least one energy consumer. The energy storage device can serve multiple concurrent energy consumer devices concurrently or as represented by an aggregate of individual energy consumer devices. In this instance, the reservation engine may not actually be able to differentiate between an individual energy consumer or the aggregate yet the fundamental requirement of maintaining each pathway that energy travels must remain below the maximum threshold.

The network energy storage devices as well as the energy consumer devices are decoupled from an energy producing asset(s) including an at least one energy production generator producing a primary energy source at a first location that is different from the energy storage device. The particularly preferred primary energy source is direct current "DC" when the energy source is electricity, and specifically preferred DC energy source has a low voltage preferably defined as a voltage typically associated with telecommunications voltage and particularly within the geographic standards such that electrical wire doesn't require rigid conduit and doesn't require "home runs" back to a main distribution panel. The preferred embodiment is such that electrical wire is free from wire interconnection restrictions between energy flow regulators. The particularly preferred embodiment is such that electrical wire between each energy flow regulator is isolated from other electrical wires connected to the same energy flow regulator, and likewise the preferred embodiment is identical for each energy consumer such that multiple independent energy pathways are provided to the energy consumer. The inventive system reduces rigid conduit between individual wall panels (i.e., understood to be distinct panels that are assembled on-site within modular housing as known in the art) by at least 20%, preferably by at least 50%, and particularly preferred by at least 80%. The inventive system increases the number of distinct individual panels to be assembled on-site by at least 20%, preferably by at least 50%, and particularly preferred by at least 80% (whereas the current art requires either larger modules occupying more shipping volume, or on-site electrical wiring through rigid conduit with electrical wiring home runs through that rigid conduit thereby increasing the amount of on-site labor and therefore less cost savings) while decreasing empty (i.e., voids) shipping volume of the aggregate of panels of the modular construction (e.g., housing, vertical farms, aquaculture, greenhouse, etc.) by at least 20%, preferably by at least 50%, and particularly preferred by at least 80%. A further advantage and feature of the inventive modular construction is an increase in integral folding structures compactness by at least 20%, preferably by at least 50%, and particularly preferred by at least 80% such that shipping empty space is reduced by at least 20%, preferably by at least 50%, and particularly preferred by at least 80%. The additional use of wireless power between individual wall panels or between individual modules further reduces rigid conduit requirements and in virtually all instances even flexible conduit when the energy being transmitted is electricity. Wireless power in combination with distributed energy storage has a fundamental advantage of reducing exposure to wireless power (i.e., electrical and/or magnetic) fields during actual use of energy consumers (i.e. occupancy of the common space).

As known in the art, the energy storage device is dispatchable such that the primary energy source is capable of being consumed as a function of time independent of its production and capable of being stored in a charged energy storage media within an energy storage inventory (preferably embedded into the 1000 module at a second (and distinct) location from the energy source. The controller operates a program stored in the non-transitory memory for an optimization model to decrease a capacity load factor of the primary energy to less than an at least one energy consumer having a peak energy consumption rating within the decoupled and distributed energy system such that the energy consumer MUST obtain energy from at least two distinct power sources simultaneously such that at least one of the two distinct power sources is from an energy storage system embedded in the 1000 module. In particular, the goal is to reduce the size rating to substantially lower than the aggregate of energy consumers recognizing that the many of the energy consumers individually have low utilization rates. One exemplary is the use of oven within a kitchen of a personal residence. Another exemplary energy consumer device is a washing machine or dishwasher or a shower. Each energy pathway has an energy flow regulator that maintains the flow of energy to always be below the maximum threshold.

The distributed energy system, particularly within a modular decentralized system, minimizes the energy transmission rating of the transmission pathway. More specifically, such as when the form of energy being transmitted is electricity, the energy transmission rating is lower that a rating threshold in which rigid conduit is required within the modular decentralized system. Within the United States as one exemplary rigid conduit is not required when the combination of current rating, power rating, and voltage rating are within the telecommunications power distribution standard (e.g., voltage is less than 48V, wattage is less than 100 watts). When the modular decentralized system is a building comprised of a series of modules or 3d printed structures the energy transmission has substantially lower capital installed costs (i.e., at least 5% lower as compared to rigid conduit, preferably at least 20% lower, and particularly preferred at least 50% lower). The size (i.e., diameter) of the energy transmission pathway (e.g., electric wire, water pipe) has both direct installation cost ramifications as well as structural ramifications (e.g., modular wall or panel thickness, strength of modular wall or panel) and therefore is optimal at a low diameter. Another advantage of telecom power is the use of DC (as compared to AC) power in terms of safety particularly within flooding conditions. The use of DC power eliminates numerous safety standards that then require building safety codes (and thus elimination of energy distribution requirements such as spacing and frequency of electrical plug outlets).

Turning to FIG. 3, FIG. 3 has three views of components within the modular system. The top view depicts the interconnections between individual 1000 modules (sequentially numbered as 1000.1 through 1000.4) such that each module has a 990 energy flow regulator as shown in FIG. 2 and FIG. 3 (and understood to be within FIG. 1 in the same orientation, though not shown due to space constraints) to precisely modulate (and more particularly to limit energy flow to less than the maximum threshold e.g., for electricity being maximum current threshold and maximum voltage threshold; or for thermal maximum temperature and maximum flow rate) the energy flow rate within each module as dictated by the pathway rating (e.g., for electrical of electrical wire current rating and electrical wire voltage rating; or for thermal of thermal bus or pipe temperature rating and pressure rating). It is further understood as shown in FIG. 1 that each 990 energy flow regulator has a transmission pathway 3.$nx$ sample point in which at least one 80.$x$ sensor state is measured. It is a primary benefit of the 1000 module with embedded and integral 40.$x$ energy storage (where x=1 . . . 4 as shown) with each energy storage device having an individual 990 energy flow regulator such that each module then has a distinct energy transmission pathway. As shown, 1000.1 module is interconnected to 1000.2 module then to 1000.3 module and finally 1000.4 module (though it is understood that fewer or more modules are within the scope of the invention). Though not shown in the top view, it is understood that as shown in FIG. 3 interior side view and as within FIG. 1 and FIG. 2, that each module preferably has an integral and embedded 40.$x$ energy storage device. Each module energy transmission pathway that is energy communications with a power source (e.g., 35.1 L.V. power transmission representing a low voltage DC energy source as itself regulated by 30.1 H.V. to L.V. power converter that reduces the voltage as known in the art of DC:DC or AC:DC power convertors) or an energy storage device MUST have a 990 energy flow regulator. The preferred energy flow regulator has at least two energy pathways which are isolated from each other, and particularly preferred to also be capable of bi-directional energy flow. Though not preferred, an energy flow regulator can be a binary flow control (e.g., open or closed) instead of the preferred variable energy flow regulator.

A preferable embodiment has multiple types of modules 1000 integrate the inventive features including furniture, wall panel, pocket door, nested seats, nested tables, light fixtures and speakers. Virtually all of these modules further benefit from utilization the energy storage as ballast, particularly when the module leverages lightweight materials as known in the art. Furthermore, the ballasted energy storage is particularly preferred to be contained within the host device when the host device is a wall panel, pocket door, or in general any panelized device such that the thermal load is thermally isolated from the exterior portion of the panelized device. Airflow is particularly preferred to be diverted away from both the exterior portion of the panelized device and importantly also diverted away from the room in which the panelized device is contained within such as shown in this FIG. 3 top view as depicted by either 40.1 or 40.3. Virtually all instances of a ballasted energy storage devices will have the energy storage device below its host device's center of gravity.

Continuing in FIG. 3, the component and flow view depict an exemplary instance where the 1000 module has both 40.6 T.H. thermal and 40.1 L.V. electrical energy storage devices. This embodiment has a series of optional though preferred as optimal components to further minimize energy flow transmission from module to module WHILE significantly reducing energy consumption through thermal energy recovery and particularly preferred through the addition of water-reuse components. In this embodiment the 40.1 L.V. energy storage device provides power through the 35.1 L.V. power transmission to a 1030 heat pump providing temperature lift, as known in the art, to recover waste heat via a 1055 heat exchanger (or heat pipe) obtained from dirty water "H2O". The 1030 heat pump in its optimal configuration provides both heating via 1035 primary thermal output and cooling via 1040 secondary co-product thermal output. Each of these outputs are optimally in energy communications respectively with 40.6 T.H. energy storage and 40.5 T.C. energy storage so that the subsequent utilization of their thermal energy is time decoupled from the operation of the heat pump. A preferred use, though concurrent, of the cooling thermal energy from 40.5 T.C. is for 1045 enhanced condensation of humid air as derived from within a bathroom during a shower. A subsequent in terms of time use of 40.5 T.C. (though not shown) is utilizing the cold thermal energy to provide local air conditioning within the bathroom after the person taking a shower is outside of the bathroom (so as to ensure comfort). The embedded energy storage within the module closest to the bathroom minimizes energy transmission losses as well as distinctly enables local and independent temperature control to the bathroom (as distinct from the other modules). The utilization of the heat pump in this exemplary scenario enables the energy consumption to be at least 75% lower than without a heat pump due to the concurrent coefficient of performance for the combined cooling and heating circuits. Another embodiment is having 1050 water-reuse device also embedded within the 1000 module. The 1050 water-reuse device is comprised of a polar non-polar membrane separator followed by a high-surface area activated carbon filter such that dirty water then passes directly through the 40.6 T.H. energy storage device to be re-heated to the target temperature thus virtually reusing all of the embedded thermal energy from the dirty water. Having this water-reuse component preferably within the module, but at least within proximity of the energy storage device(s).

Yet another embodiment of distributed storage, though in this instance, the stored content is CO2. A major design consideration in modular construction is centralized air distribution system particularly for maintaining fresh air. This is traditionally done through air ducting, typically done through central air, in which numerous design impacts exist that are averse to modular panels. Interconnections of fresh air "supply" ducts between modular panels, or requiring structural modifications to avoid supply ducting, are best avoided by reducing (or preferably eliminating centralized supply or return) air ducting. This is best accomplished by integrating 3000 CO2 Air Scrubber (as shown in FIG. 3 interior side view) embedded into the modular panel (it is understood that all references to modular panel can be modular wall panels or modular floor panels). Distributed (i.e., decentralized) air scrubber has the concurrent advantage of removing CO2 from the interior air space, thus enabling super-insulated buildings to both reduce energy consumption, but also to reduce modular panel thickness and interconnections. Another embodiment is the utilization of a roaming CO2 air scrubber powered preferably by energy storage batteries or wireless power. An advantage of a roaming scrubber is the ability for the CO2 to be desorbed in a second location, such as in an algae growth chamber or greenhouse, while concurrently reducing or eliminating the centralized air supply or return ducting. In virtually all instances given the distributed nature of the inventive energy storage, air flow for thermal management purposes is best done by a solid-state air flow generator due to its substantially quiet operations. The ion wind generator 1010 is one such solid-state air flow generator as shown. The ion wind generator 1010 can be substituted with virtually any solid-state air flow generator including piezoelectric flexible thin film actuator creating a motion to displace and create air flow (notably to break the boundary layer to increase heat transfer away from the energy storage device).

Figure 4:
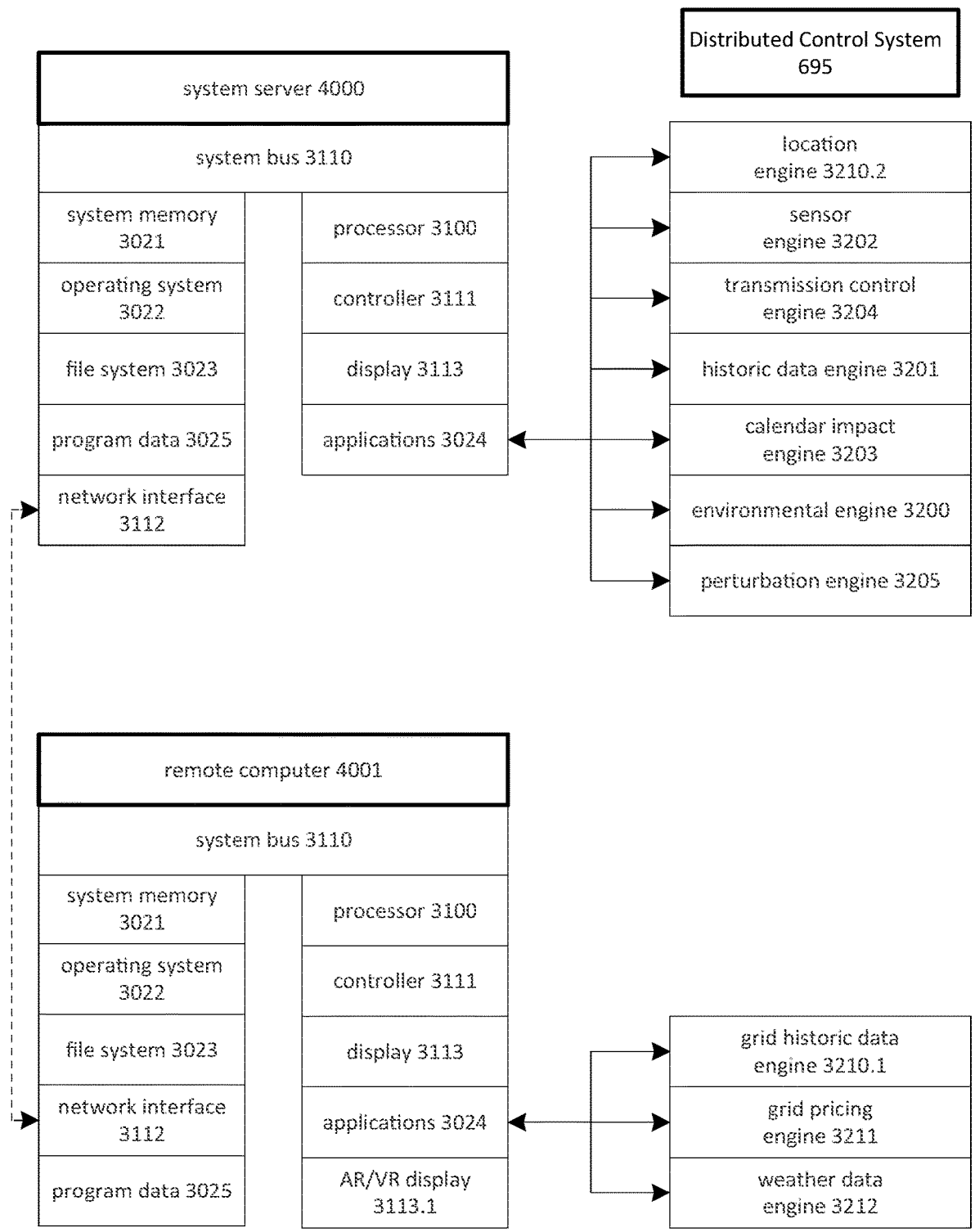
FIG. 4 is a communication flow diagram of controller architecture of the modular distributed energy storage system.

Turning to FIG. 4, FIG. 4 is a communication flow diagram of controller architecture of the modular distributed and segmented energy storage system. The system has at least one system server 4000 with either integral (though not shown as distinct) or a remote computer(s) 4001 in which a grid historic data engine 3210.1 with a grid pricing engine 3211 and preferably with a weather data engine 3212 such that in the aggregate the feedforward with feedback controller is capable of optimizing energy flow in each regulated and switchable energy flow segment. Both the system server 4000 and remote computer 4001 have a hardware system bus 3110 integrating the system memory 3021 operating an operating system (preferably real-time) 3022 to operate programs stored in a file system 3023 to access program data 3025 as determined by the processor 3100 in conjunction with a controller 3111 (having an optional display 3113 or augmented reality/virtual reality display 3113.1) processing a range of applications 3024. Each isolated segment preferably has a distributed control system 695, though not shown, also has a hardware system bus 3110 integrating the system memory 3021 operating an operating system (preferably real-time) 3022 to operate programs stored in a file system 3023 to access program data 3025 as determined by the processor 3100 in conjunction with a controller 3111 (having an optional display 3113 or augmented reality/ virtual reality display 3113.1) processing a range of applications 3024. The inventive feedforward-feedback control system has a location engine 3210.2 that preferably has a geospatial map of each vector and the vectors are in a multi-dimensional space domain (i.e., vector can be in a 2-dimensional or 3-dimensional representation showing relative dimensions or orientation to the other interconnected vectors relative to the energy flow segment) and segment (as depicted in FIG. 6), a sensor engine 3202 reading each connected sensor (notably current and voltage in real-time for at least each vector and segment) as well as leveraging machine learning to establish meta-sensors (i.e., virtual data establishing superior predictive capabilities particularly as the meta-sensor data contains data ranging from weather to calendar impact as obtained from the historic data engine 3201 (including time of day, and preferably time of day overlaid with the other data impact engines) and calendar impact engine 3203 (date specific data such as holiday, day of week, season, etc.) and environmental engine 3200 (data specific to environmental parameters such as allergies, fires, combustion emissions, etc.) all bundled into a decision matrix coordinating energy transmission, energy storage, and energy consumption via the transmission control engine 3204 such that each regulator/switch (not shown 990) and each vector within each segment is precisely coordinated across at least energy flow current and preferably also voltage. The perturbation engine 3205 specifically implements an overlay of historic data with at least one of location engine, calendar impact engine, and environmental engine to establish increasing accuracy of energy consumption of each energy consumer connected to the inventive distributed energy storage system. The resulting system enables a substantially reduced peak current amperage such that the preferred embodiment of enabling a virtual absence of rigid conduit notably within the range of modules 1000 as noted in FIG. 3. The transmission control engine 3204 is a composite control system that regulates segmented energy transmission and is the heart of the feedforward application (as noted in FIG. 5) such that the combination with the perturbation engine 3205 improves the system energy efficiency by at least 5% and preferably by at least 20% over a segmented energy flow system without the combination of the feedforward applications and perturbation engine.

Figure 5:
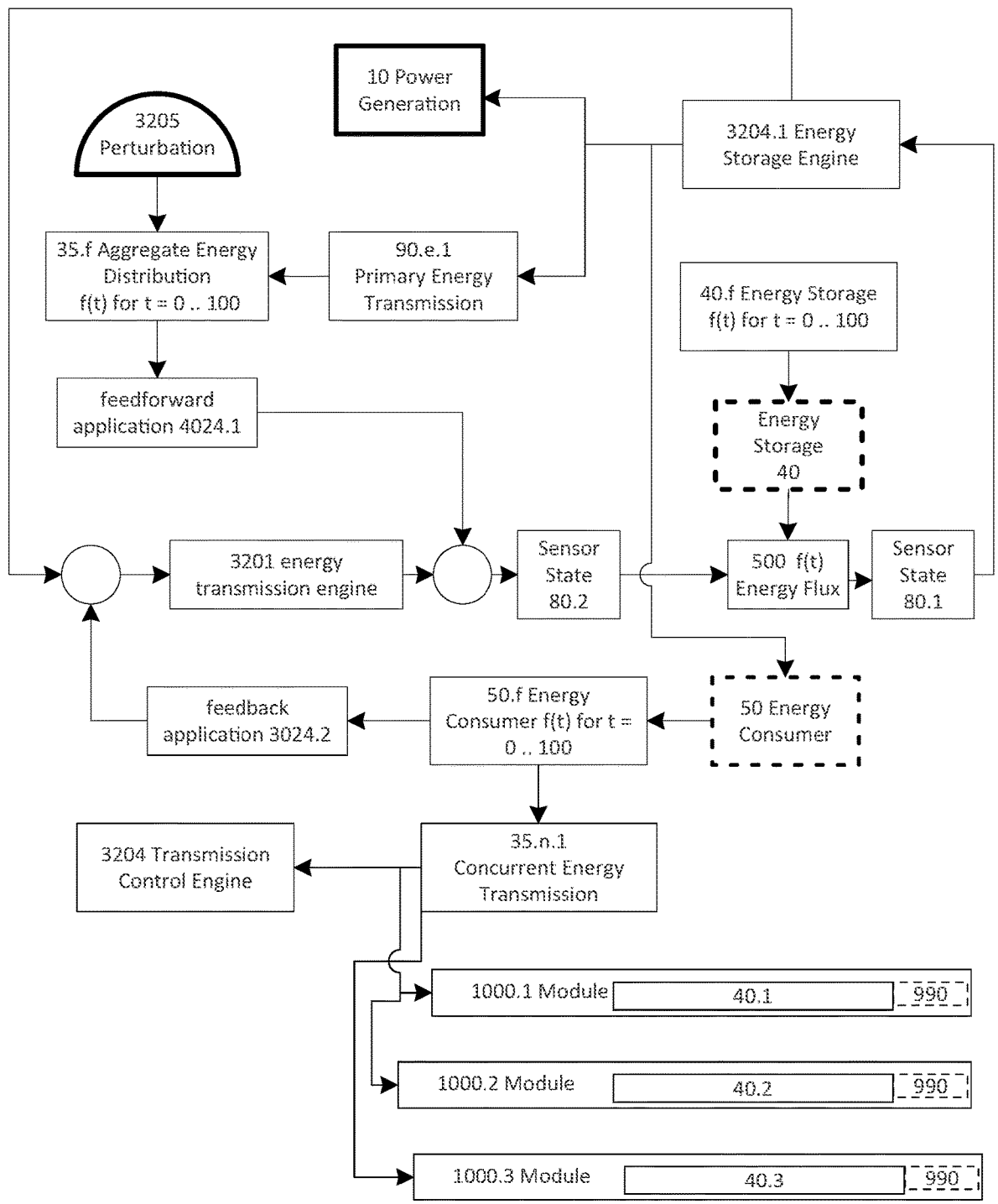
FIG. 5 is a process logic flow diagram of the controller depicting the feedforward with feedback architecture.
Figure 6:
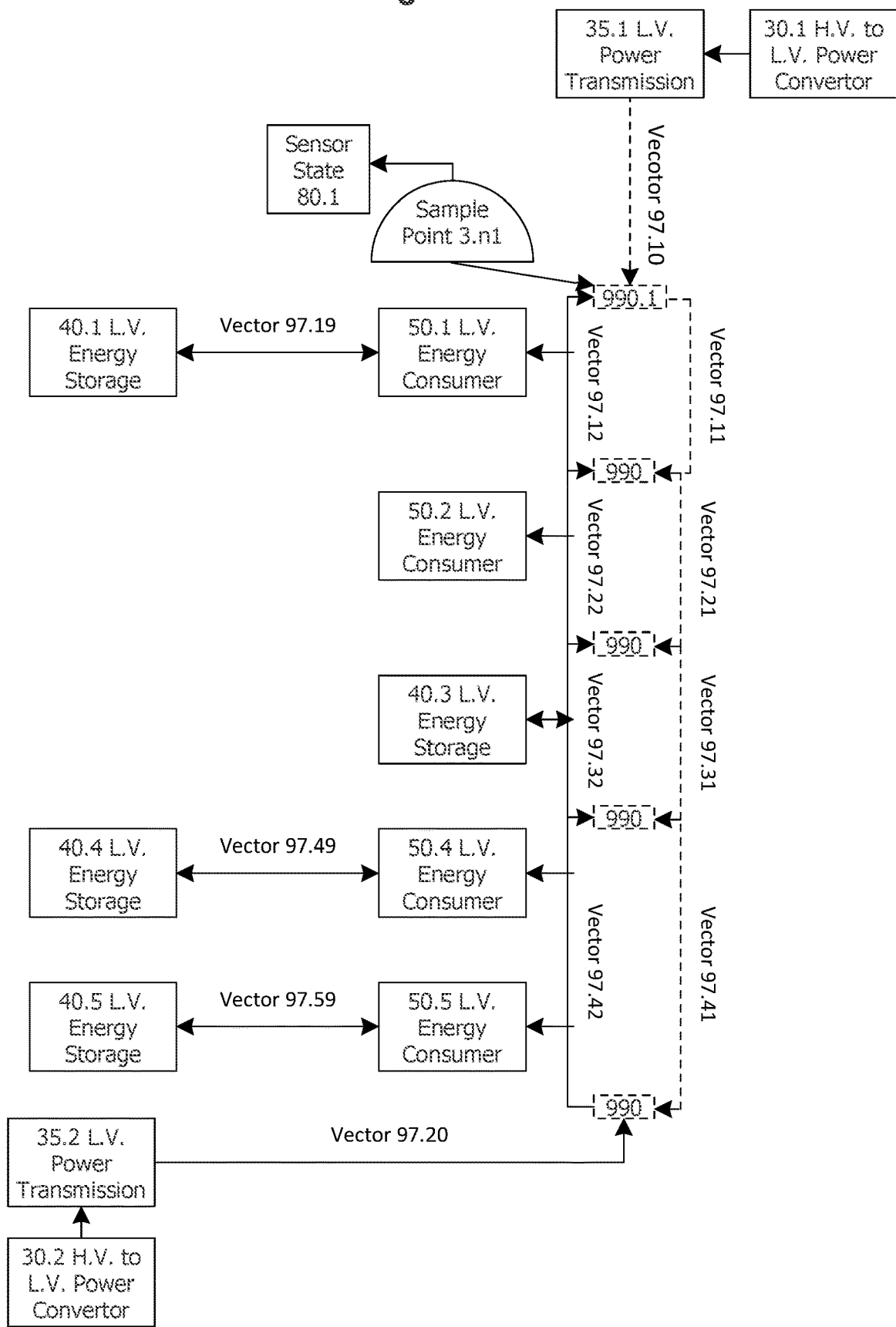
FIG. 6 is a power vector flow diagram of the energy flow between regulated energy segments.

Turning to FIG. 5, FIG. 5 is a process logic flow diagram of the controller depicting the feedforward with feedback architecture such that each connected (and notably those that have communications capability with the distributed control system e.g., IoT or M2M as known in the art) energy storage 40, power generation 10 generator, and energy consumer 50 is directly or at least indirectly via regulator/switch 990 state maintains current and voltage thresholds through the concurrent energy transmission segments $35.n.1$ as shown to modules 1000.1, 1000.2, and 1000.3 each having an optional energy storage device respectively 40.1, 40.2, and 40.3 as collectively controlled by the transmission control engine 3204. The feedforward portion of the control system preferably provides power generation signals (or at least is responsive to power sources as made available by power generation 10 generators (including energy storage devices external of the distributed control system) through the primary energy transmission grid $90.e.1$ (understood to be at least one source, such that the system has a primary energy transmission grid for each type of energy source e.g., thermal cold or thermal hot) creating an aggregated energy distribution collective $35.f$ as a function of time. The perturbation engine 3205 in combination with the feedforward application(s) 4024.1 for each type of energy flow improves the feedback portion of the control system responding to real-time actions definitively maintaining each vector and each segment and each energy storage device and each energy consumer within their respective operating envelope (i.e., below their maximum thresholds such as obtained by sensor state 80.2 e.g., voltage and sensor state 80.1 current) to regulate energy flux/flow 500 in real-time to each connected energy storage 40 device becoming an aggregated energy storage as a function of time $40.f$. The feedback portion also includes at least over-riding regulation and control of energy consumer(s) 50 through an aggregated function of time $50.f$ for each type of energy through the feedback application 3024.2. It is a fundamental inventive aspect of the system such that concurrent energy storage charging within an individual vector/segment occurs with energy storage discharging within a different individual vector/segment such that additional energy flow capacity within a given vector/segment is utilized to greatly reduce (by at least 5%) instances in which energy consumers do not have adequate energy flow through its respective energy flow pathways to meets it real-time energy demand. The fundamental objective is such that the energy flow pathway from the power generation 10 generator is never required to meet the real-time demand of any given energy consumer 50 to reduce peak transmission capacity through a distributed co-located energy storage 40 device such that at least one energy consumer has at least two individual concurrent energy transmission $35.n.1$ pathways to serve peak demand energy consumption.

The preferred method of system control utilizes the tracking of variable states of including transient conditions, whether it be by weather data, environmental data, calendar data or grid data including grid pricing data collectively referred to as input data. The primary factors impacting the variable states are the energy storage systems as regulated within the segment they are in energy communication with by a first beginning energy flow isolation switch and a second ending energy flow isolation switch (except when the segment is a terminating segment), and energy consumers within the same segment as in direct energy communication to the segment energy pathway transmission or a separate and individually connected energy storage device in energy communication with the energy consumer. The energy flux is a calculated parameter based on each segmented power transmission segment based on a current sensor and a voltage sensor reading, with another important parameter including the energy storage charge or discharge rate and also energy consumption of each of the energy consumers being a reference transient to predict energy flux as a function of time combined with machine learning patterns as obtained and correlated to historic data, calendar impact data, environmental data and weather data. The primary function of the feedforward control system is to establish a variable based on the predicted energy flux of each segmented power transmission segment and an aggregate energy distribution of the each segmented power transmission segment such that a shortfall of energy to each energy consumer is avoided by ensuring sufficient stored energy is available as a function of time on either the same segment in which the energy consumer is on or neighboring segments such that the aggregate current demand (within the voltage threshold) doesn't exceed the current threshold for any of the interconnected segments in which energy flow must take place to meet both the individual demand of each energy consumer as well as the aggregate within each segment. A feedback variable, as determined by the systems control processor establishes a control variable based on a multi-variable coupled combination of the feedforward variable and a feedback variable leveraging real-time current and a real-time voltage as available through sensors on each segmented power transmission segment such that energy flow is regulated to prevent the maximum current threshold and the maximum voltage threshold from being exceeded. The multivariable coupled combination of the feedforward variable and the feedback variable is calculated by a discretized dynamic equation (including a vector pattern recognition as established by machine learning as known in the art) with control of each energy flow isolation switch and the energy storage charge or discharge rate for each of the energy storage systems, the aggregate energy distribution as a function of time for each of the segments, and both individual and aggregate stored energy states (both real-time and projected as a function of time) of each of the energy storage systems. An open loop scheduler of scheduled events for energy consumers establishes discrete energy flux demand in combination with the feedforward projected energy flux demand. Variations can occur in an uncontrolled manner from the scheduled events becoming real-time disturbances as compared to the open loop scheduled energy consumer individual and aggregate demand. The control system contemporaneously controls operation of the segmented energy storage system based on the control variable, notably the charging and discharging of energy storage devices including the "movement" of stored energy from one segment to a second segment in anticipation of the energy flow pathway transmission segment being insufficient to meet energy consumer demand without otherwise exceeding the maximum current and/or maximum voltage thresholds.

The control method can suppress through disturbance rejections to attenuate the effects of uncontrolled energy consumers. The control method obtains input data, also from the uncontrolled power generation generators in an interconnected grid or from a combination of uncontrolled or controlled power generation generators on a micro-grid. The control system can apply a method of calculating a new location for any of the energy storage systems relative to another segmented power transmission segment based on a feedforward calculation (i.e., projected) of future current and voltage demand for each segment, and then subsequently issuing manual or automated movement commands for the repositioning of the energy storage system. When the energy consumer is either transportable or capable of being moved and the energy consumer is preferably outfitted with a wireless power receiver the control system can alternatively issue movement commands for the repositioning of the energy consumer off of a first segment to another segment. The control system provides a multivariable feedback control loop having dynamic tuning by the control system to contemporaneously control the operation of all interconnected energy storage device and energy consumer devices within the modular distributed energy system.

Turning to FIG. 6, FIG. 6 depicts the power flow between vector segments such that the vectors are isolated in a bi-directional manner between energy isolated regulators/switches 990. The vectors within the control system are required for each energy communication flow path from all energy sources, which includes (though not shown in terms of additional power "flow" vectors from energy storage 40.3) bi-directional capability enables multiple power sources (such as depicted 35.1 and 35.2 respectively from the top of the figure and the bottom of the figure as shown. Each energy isolated regulator/switch 990 has at least one sample point 3.$n$1 with at least one sensor state 80.1 (as obtained by sensors as known in the art, notably current and preferably also voltage), though only the top regulator/switch 990.1 is depicted. The fundamental objective of tracking the vectors is to ensure that the energy communication pathways never exceed the rated maximum energy flow ratings of each and every vector segment. The control system specifically controls each regulator/switch 990 in terms of both direction of energy flow and isolation from any specific segment or segments. Vectors are inherently capable of being bi-directional though from a practical perspective energy consumer(s) such as 50.1, 50.2, 50.4, and 50.5 are only capable of drawing/receiving energy and not producing energy unless the energy consumer has pass-through capabilities of integrally connected energy storage devices respectively 40.1, 40.4, and 40.5. Though depicted as two distinct directional-specific vectors (e.g., vector 97.11 and vector 97.12, collectively representing one energy flow segment such that a segment is by definition an energy flow path between two regulators/switches 990 unless the segment is a terminating energy flow path physically only capable of receiving energy from one power transmission pathway whether from a traditional energy source or an energy storage device) for visual clarity it is understood that in virtually all instances it is actually only one flow path but represented in the control system preferably as two different vectors for ease of programming/scheduling such that the vectors effectively have uni-directional energy flow paths. Any given segment can have multiple energy consumers (e.g., 50.4 and 50.5), or service just a single energy consumer 50.2 or a single energy storage 40.3 device. Though not shown, it is understood that virtually any combination of energy consumer and energy storage devices can be in energy communication with an energy segment as isolated by two regulators/switches 990. FIG. 6 doesn't depict any wireless power sources (i.e., FIG. 2 power wireless transmitter 35.5) but it is understood that it is only for the purpose of simplifying the figure and not reflective of the complexity of the invention.

Another embodiment of the invention is when the energy storage device is an electrical energy storage (e.g., battery) embedded in a pocket door which is also integral to the modular wall panel. The guide track for the pocket door concurrently serves as an electrical bus eliminating the requirement for a separate electrical interconnection, while also providing electricity for the pocket door when the pocket door has a method as known in the art to move the pocket door from an open to close (and vice versa) position via an electric motor. The guide track preferably extends beyond the length as required for the pocket door and particularly preferred extends the entire length of the modular panel to provide electrical continuity first to the energy flow regulator and then as interconnection between adjoining modular panels. The integral energy storage device serves as a ballast within the pocket door that also provides a sense of higher quality product of the pocket door due to its heaviness. The sliding capability of the pocket door also serves as a very easy method to enable access and service to the integral energy storage within the modular wall panel. Yet another embodiment of the pocket door has open access such that the when the pocket door is in the open position the energy storage device within the modular wall panel slides into the void space of the pocket door.

Another more recently commercially available form of energy is recognized in the art as "wireless power". Though wireless power is recognized as safe for people, it is an object of the invention to leverage multifunctional benefits of energy storage within 1000 modules such that the energy storage achieves its primary function of energy storage in direct energy pathway with an energy consumer, being a weight ballast to the energy consumer (further enabling the energy consumer to leverage high strength to weight ratio materials and maintaining a safe center of gravity), and reducing the in-module electrical wire requirements. The particularly preferred embodiment of the wireless power is for the wireless power transmitter 35.5 (as in FIG. 3, interior side view) such that the wireless power transmitter 35.5 is in energy communication with the removable and preferably reconfigurable 1020 cover plate. The cover plate is multi-functional in its ability to achieve functions of 1) easy access swinging/sliding door to the embedded and integral energy storage device, 2) variable up or down air flow (when the energy storage is thermal) directional control of the 1025 embedded air flow preferably such that the air flow is achieved on an intermittent (high-frequency of greater than 30 Hz, particularly preferred greater than 300 Hz) basis to increase convective heat transfer from the 40.4 T energy storage device to the physical space in which the 1000 module resides as regulated by the 990 energy flow regulator.

When the energy transmission is in the form of thermal energy within a heat transfer fluid, notably water, the size of the pathway (i.e., pipe diameter) is dictated by temperature differential versus ambient temperature. It is advantageous for the temperature differential of the working fluid to be as high as possible (hot when the fluid is desired as a heat source, or cold when the fluid is desired as a cooling source). Counter to that argument is the higher the temperature differential then requires thick insulation to minimize energy losses. Therefore, it is advantageous for the pipe diameter to be as small as possible to minimize modular wall/panel thickness, as well as minimizing the potential leakage of working fluid. However, the skinnier the pipe the higher the fluid flow resistance. Therefore, the inventive energy storage system has a water fluid system with a pipe diameter at least 10% smaller (and preferably at least 30% smaller, and particularly preferred at least 50% smaller) as compared to a piping system without any distributed energy (thermal) with or without integral water storage. The further optimal piping has an integral drag-reducing coating in the interior of the pipe to reduce friction losses. And the yet further optimal piping has a distributed water recovery/reuse system that enables reuse of the water with its embedded thermal energy so as to further minimize the fluid velocity (and therefore of course the fluid consumption) within the piping. The particularly preferred water recovery/reuse system enables a fluid consumption reduction of at least 10%, preferably at least 50%, and particularly preferred at least 80% as compared to a non-distributed energy storage without water recovery/reuse system. At the very least, an integral fluid to fluid heat transfer heat exchanger exists to enable thermal energy recovery of at least 10%, preferably at least 50%, and particularly preferred at least 80% as compared to a non-distributed energy storage without thermal recovery/reuse system. Water that isn't fully recovered or reused is optimally repurposed as a grey water also on a distributed basis, such as water from the shower being used as toilet water. This has the primary objective of further reducing return piping diameter again reducing modular wall/panel thickness (or sewer return lines) throughout the modular system.

The transmission control engine sequences the charging and discharging of the energy storage modules. Contrary to the prior art in which charging and discharging decisions are made solely on levelized cost of energy at best and most often on the pricing differential between peak and off-peak power, the inventive transmission control engine must also ensure that each transmission pathway remains below the maximum threshold while also needing to minimize the impact of operations of each connected energy consumer. Therefore, the distributed energy storage modules can be scheduled to charge during peak periods in order to meet the predicted (or scheduled) use of energy consumer if in fact the energy storage system can't meet sufficient kWh or kW demand without the additional and concurrent utilization of kWh and kW from the second energy source via the energy transmission pathway from external of the module in which the energy storage is located. In addition, and by system design, during off-peak periods the energy consumer (particularly for high demand, though low utilization factor, devices such as kitchen oven or dishwasher) will concurrently draw energy from both external energy source via the module energy transmission pathway, and the immediately co-located and with direct electrical connection through a second isolated energy from the energy storage device. Both of these scenarios are inferior in terms operating costs BUT enable the lower initial capital equipment costs to be realized.

A energy transmission system comprised of: a controller, the controller having a memory having at least a portion being a non-transitory memory; a reservation transaction unit to configure, schedule, and dispatch at least one reservation for a network of decoupled energy assets using the non-transitory memory; the network of decoupled energy assets including an at least two energy production generator producing a primary energy source that is dispatchable whereby the primary energy source is capable of being consumed as a function of time independent of its production and capable of being stored in a charged energy storage media within a dispatchable charged energy storage inventory at a first location; the network of decoupled energy assets including an at least one energy production generator producing a byproduct that is dispatchable independently of the primary energy source and is capable of being consumed as a function of time independent of its production and capable of being stored in a module embedded energy storage device; and whereby the controller operates a program stored in the non-transitory memory for an optimization by a model comprised of at location-specific energy pricing, minus projected penalties from failures to provide adequate energy to the energy consumer device.

Figure 7:
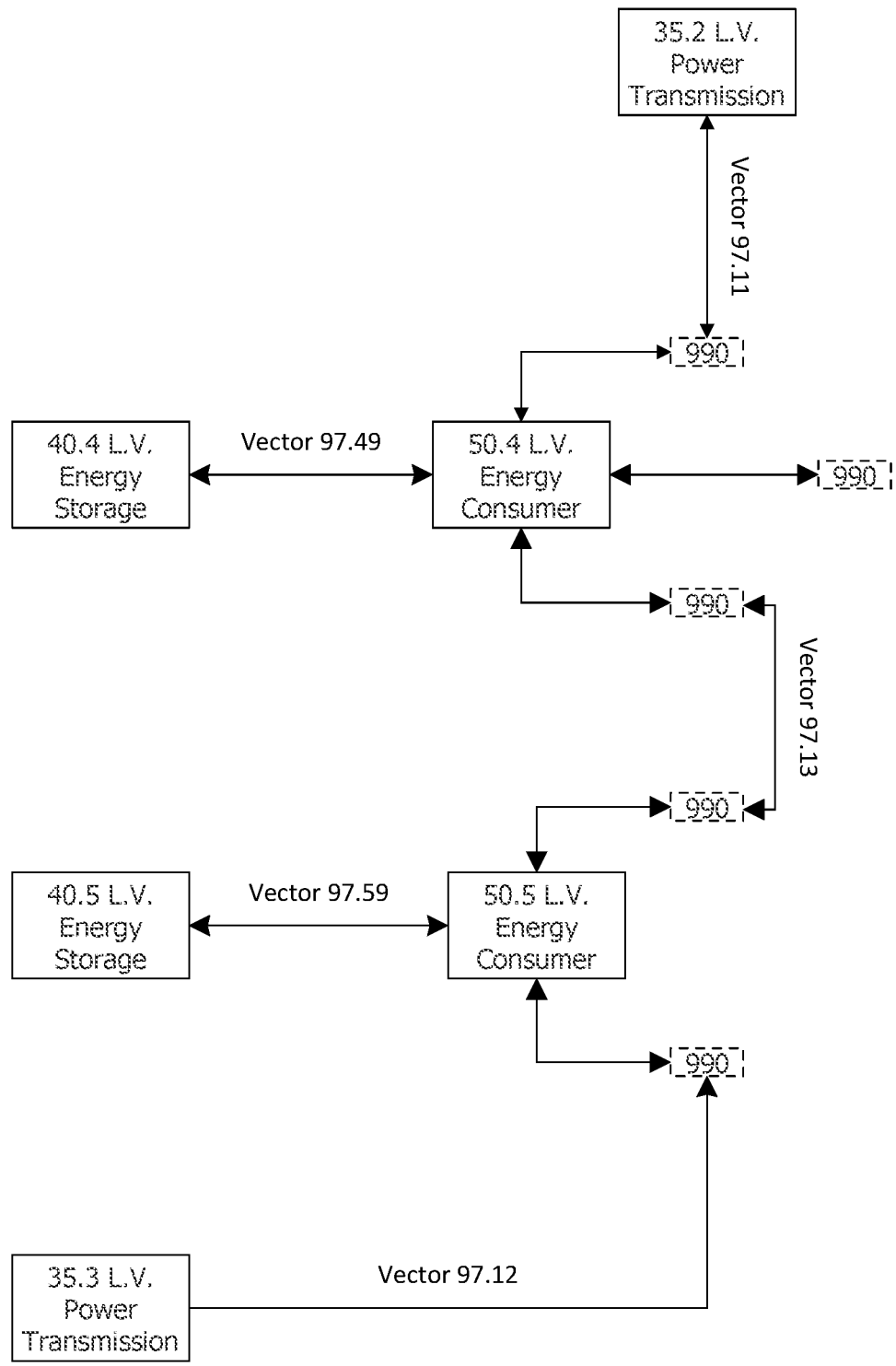
FIG. 7 is a power vector flow diagram of the energy flow between regulated energy segments, though showing more detail than FIG. 6.

Turning to FIG. 7, FIG. 7 depicts additional details as compared to FIG. 6, notably as described in FIG. 6 the two distinct directional-specific vectors (e.g., vector 97.11 and vector 97.12, collectively representing one energy flow segment such that a segment is by definition an energy flow path between two regulators/switches 990 unless the segment is a terminating energy flow path, where each of the energy consumers 50.4 and 50.5 have an isolation switch 990 for each of the energy flow segments. The isolation switch has the capacity to isolate and prevent energy from flowing from the first segment providing energy flow to the energy consumer to the second segment such that a second energy consumer energy flow will not create a scenario where the energy flow of the first segment and the energy flow of the second segment will cause the real-time current and real-time voltage to then exceed the current, voltage and/or power rating of the wire within either of the first segment or the second segment. The isolation switches 990 enable a first segment for the first energy consumer 50.4 to receive power from a first power transmission (i.e., power supply) 35.2, while the second segment for the second energy consumer 50.5 receives power from a second power transmission (i.e., power supply) 35.3. In this figure each energy consumer 50.4 and 50.5 have directly connected (and capable of power isolation though not shown via an isolation switch 990 or as known in the art battery management system providing current (i.e., amperage) control. It is understood that every energy consumer does not require a directly connected energy storage system. Alternatively, any one of the representative energy consumer 50.4 or 50.5 can be substituted (or additional nodes) with an energy storage device having a corresponding battery management system or dedicated isolation switch 990.

Figure 8:
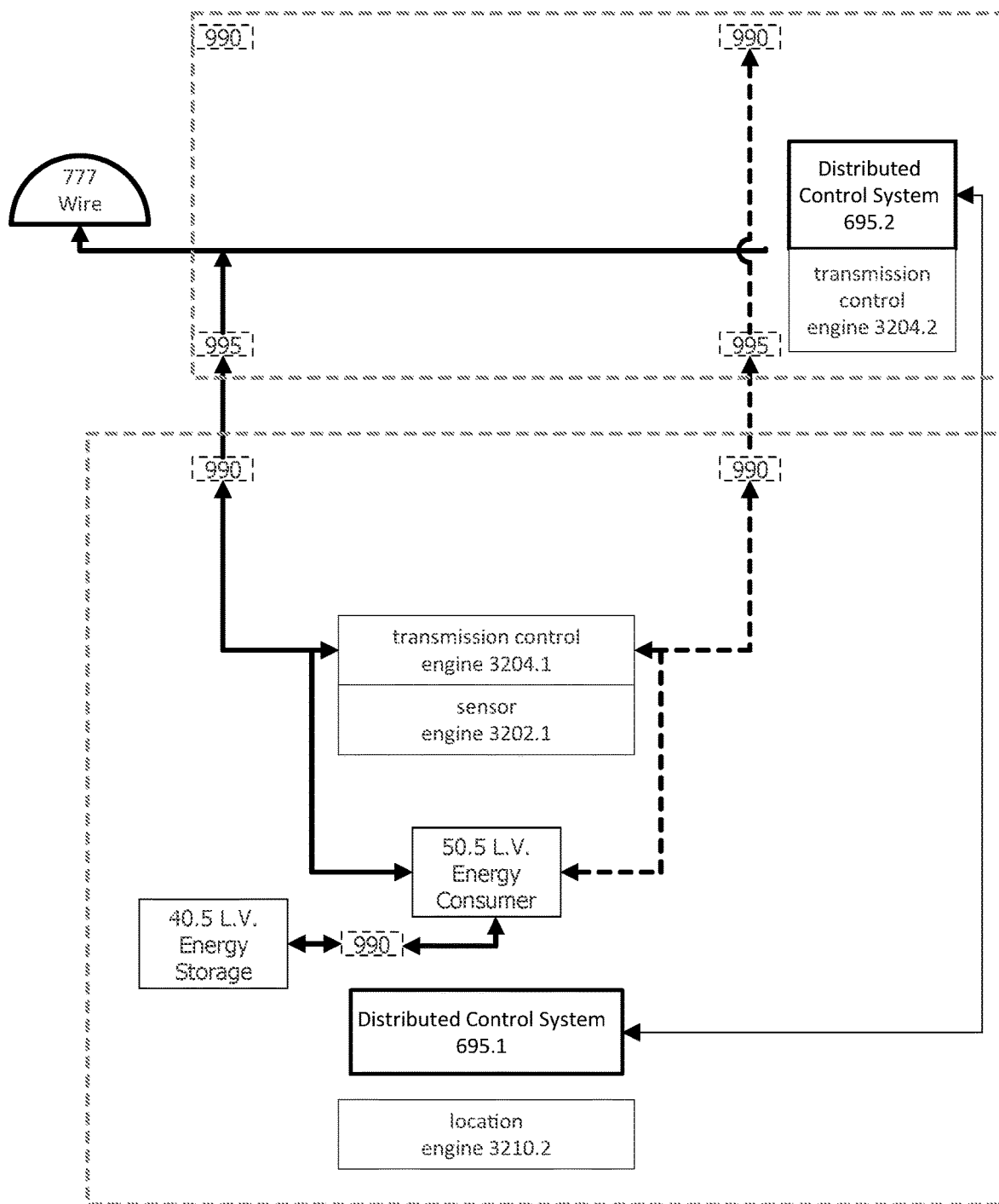
FIG. 8 is a power vector flow diagram of the energy flow between regulated energy segments, though showing more detail than both FIGS. 6 and 7.

Turning to FIG. 8, FIG. 8 depicts further details, though described in the earlier FIG. 6, of the components of the inventive energy consumer 50.5 having a co-located or internal energy storage 40.5 with a distinct and energy flow isolated switch/regulator 990 in electrical communications. The energy consumer 50.5 has a first energy flow pathway through one first energy segment (shown as going into/out of the left-hand side of the energy consumer 50.5) and a second energy flow pathway through one second energy segment (shown as going into/out of the right-hand side, and depicted as a dashed line, of the energy consumer 50.5). The energy consumer has the distribute control system 695.1 in control system communications with sensors (though not shown, each switch/regulator 990 has at least a current sensor and preferably also a voltage sensor) such that the sensor engine 3201.1 calculates the power in each segment so as to ensure each energy source prior to being blended for internal power consumption by the energy consumer 50.5 is sufficient to meet the real-time demand while also ensuring that each segment power flow remains lower than the maximum threshold parameters (e.g., current, voltage, power). As noted earlier, one of the fundamental objectives is to maintain power and current levels at all times (despite the energy consumer 50.5 requiring peak power in excess of any given segment maximum threshold parameters) at levels not requiring rigid conduit (or restrictions against cascading extension cords). The transmission control engine 3204.1 is that portion of control logic and associated hardware to enable both energy flow into/out of the energy consumer 50.5 but also to either bypass or enable further power consumption into a second energy consumer (not shown in this figure, but shown in FIG. 6) or a second energy storage device (also not shown in this figure, but shown in FIG. 6) such that this energy flow is in electrical communication with switch/regulator 990 (on board or integral of energy consumer 50.5) then through an optional external energy switch/regulator that is adjoining (optimal implementation is such that a magnetic coupling as known in the art maintains electrical continuity, though without the danger associated with accidental dislodging of connector). In this FIG. 8 (995) is shown, with the understanding that both 990 and 995 are not required on the same energy flow segment. Also in this figure the external adjoining segment connector has an onboard distributed control system 695.2 as a well as transmission control engine 3204.2 to control the flow of energy in electrical communication with to a wire pair 777 (at least a positive cable, and preferably also a negative cable rather than assuming alternative ground mechanisms as known in the art) regulate the flow of energy into at least one additional energy consumer or energy storage device. Again it is understood that the external connector can gain all control logic and hardware by the host energy consumer (or energy storage device) yet in the situation that more than at least second (or third, and/or fourth) energy consumer or energy storage device is daisy chained for electrical continuity it is fundamentally advantaged that the external connector (within the top dashed rectangle) has its own dedicated distributed control system 695.2 and transmission control engine 3204.2 such that not only is energy flow provided through 777 but also a bypass pathway as shown with a dashed line through the top dashed rectangle from the lower 995 switch/regulator to the above 990 switch/regulator. The wire 777 can be any cable assembly methods as known in the art, though the preferred is a retractable coiled wire assembly for maximizing speed and convenience of connecting the numerous energy storage and/or energy consumer devices located within approximately the same physical space but multiple feet apart from each other.

Figure 9:
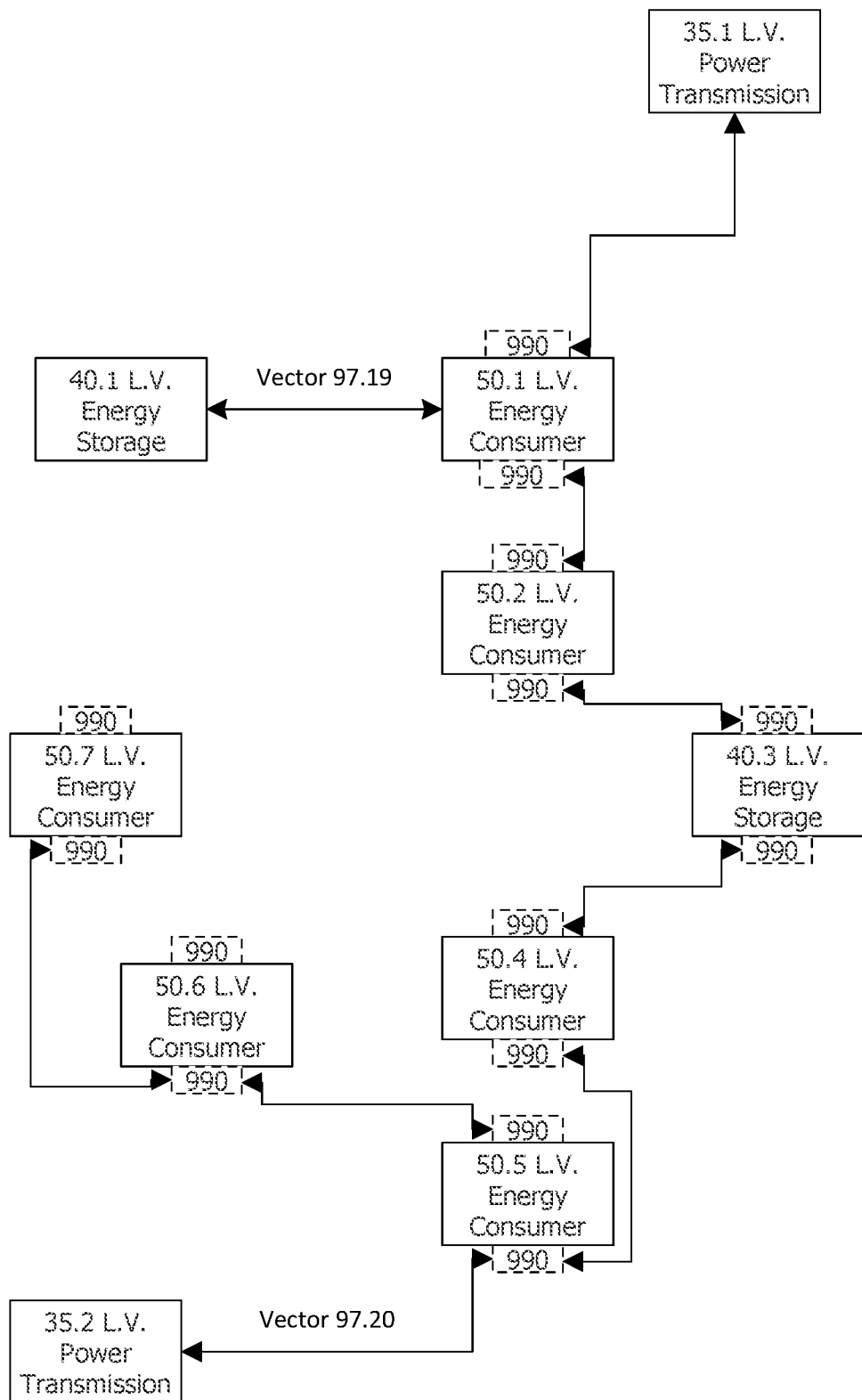
FIG. 9 is a power vector flow diagram of the energy flow between regulated energy segments, though showing more detail than FIG. 6 in terms of the multiple isolated segments for each energy consumer.

Turning to FIG. 9, FIG. 9 shows one exemplary series of daisy chain electrical connections in each inventive energy consumer has at least two isolated energy flow pathway segments (though not shown, it is understood that a series of external electrical connections in excess of two isolated energy flow pathway segments). Beginning from the top of the figure, a first power/energy source is 35.1. This energy flow is through a first segment going into a first isolated energy flow pathway via 990 into energy consumer 50.1, which has another isolated energy flow pathway between the energy consumer 50.1 via segment 97.19 to its adjoining energy storage device 40.1. For the purpose of being more concise, this above level of detail is not repeated but understood for each daisy chained electrical connection. When power is not isolated but rather enabled to both serve the host energy consumer (or energy storage) device and bypass (though with power isolation and active segmentation) electrical continuity is from energy consumer 50.1 to energy consumer 50.2 to energy storage 40.3 and then to energy consumer 50.4 and then to energy consumer 50.5. As depicted energy consumer 50.5 is in electrical communication with a second power source 35.2 and therefore through active control of each electrical segment it is possible that the aforementioned daisy chain can effectively have energy flow from both power sources to all of the shown energy consumers 50 and energy storage 40 devices, and notably as the inventive system any of the switch/regulators 990 can break the electrical continuity such that a subset is served from the first power source 35.1 and the remaining subset is served from the second power source 35.2.

There is an electrical continuity branch from energy consumer 50.5 that flows to energy consumer 50.6 and then to energy consumer 50.7. In this exemplary, energy consumer 50.5 has two external electrical connectors one going to energy consumer 50.5 (as shown on the left) and energy consumer 50.4 (as shown above). It is understood that there is no practical limit to the number of nodes as well as the number of branches therefore enabling the range of energy consumers and energy storage devices to be easily served in a manner that eliminates rigid conduit and therefore a very important feature to enable reconfigurable and dynamic placement of the host devices.

Although the invention has been described in detail, regarding certain embodiments detailed herein, other anticipated embodiments can achieve the same results. Variations and modifications of the present invention will be obvious to those skilled in the art and the present invention is intended to cover in the appended claims all such modifications and equivalents.

What is claimed is:

1. A modular distributed energy system comprising: an energy flow isolation switch as part of a segmented energy storage system, an energy flow connector being substantially flexible between a first energy flow segment having a first energy storage device in energy flow communication with a first energy consumer of the segmented energy storage system and a second energy flow segment having a second energy storage device in energy flow communication with a second energy consumer of the segmented energy storage system, whereby the first energy consumer has a peak power rating that exceeds a maximum current threshold and a maximum voltage threshold of the first energy flow segment, whereby the first energy consumer blends energy flow from the first energy flow segment and energy flow from at least one of the second energy flow segment or the first energy storage device to provide energy flow at the first energy consumer peak power rating, and whereby the energy consumer has energy flow directly from the energy storage device on a same energy flow segment.

2. The modular distributed energy system according to claim 1, whereby the first energy consumer is energy flow coupled to the first energy flow segment and is energy flow coupled to the first energy storage device, and whereby the first energy consumer receives energy flow concurrently through a first isolated connection to the first energy flow segment and a second isolated connection to the first energy storage device.

3. The modular distributed energy system according to claim 1, whereby the energy consumer is capable of receiving energy directly from the energy storage device on the same energy flow segment wherein a substantial portion of the energy flow is directly from the energy storage device to reduce a balance of the energy flow required to meet a real-time demand of energy flow of the energy consumer from flowing on the same energy flow segment.

4. The modular distributed energy system according to claim 3, further comprising a variable energy flux modulation regulator and whereby the balance of the energy flow is through the variable energy flux modulation regulator.

5. The modular distributed energy system according to claim 1, further comprising a wireless energy receiver on at least one of the first energy storage device or the second energy storage device, and a wireless energy transmitter coupled to the energy flow segment whereby the transmitter transmits energy flow directly to either the first energy storage device or the second energy device.

6. The modular distributed energy system according to claim 1, further comprising a wireless energy receiver on at least one of the first energy consumer or the second energy consumer, and a wireless energy transmitter coupled to the energy flow segment whereby the transmitter transmits energy flow directly to either the first energy consumer or the second energy consumer.

7. The modular distributed energy system according to claim 1, further comprising a wireless energy transmitter coupled to energy flow segment whereby the transmitter transmits energy directly to the energy storage device on the same energy flow segment.

8. The modular distributed energy system according to claim 1, further comprising a solid-state air flow generator operable to increase heat transfer away from at least one of the first energy storage device and second energy storage device.

9. The modular distributed energy system according to claim 8, whereby the solid-state air flow generator is an ion wind generator.

10. The modular distributed energy system according to claim 1, whereby at least one of the first energy storage device and second energy storage device is a ballasted energy storage device and wherein the ballasted energy storage device is below a host device's center of gravity.

11. The modular distributed energy system according to claim 10, whereby the host device the host device is at least one of a ballasted furniture, a nested seat, a ballasted light fixture, a ballasted speaker, or a nested table.

12. The modular distributed energy system according to claim 11, whereby the host device is further comprising a wireless power receiver and a wireless energy transmitter coupled to the energy flow segment whereby the transmitter transmits energy flow directly to the wireless power receiver on the host device.

13. The modular distributed energy system according to claim 10, whereby the host device the host device is at least one of a wall panel or a panelized device.

14. The modular distributed energy system according to claim 13, whereby the wall panel or the panelized device is further comprising an exterior portion and whereby a thermal load from the at least first energy storage device or second energy storage device is thermally isolated from the exterior portion of the wall panel or the panelized device.

15. A method of tracking variable states of a modular distributed energy system for controlling the modular distributed energy system in transient conditions by a control system comprised of an at least one energy storage system, an at least two energy flow isolation switches as part of a segmented energy storage system, and an at least one energy consumer whereby the at least one energy consumer has a peak power rating that exceeds a maximum current threshold and a maximum voltage threshold of a first energy flow segment of the segmented energy storage system, whereby the at least one energy consumer blends energy flow from the first energy flow segment and energy flow from at least one of a second energy flow segment of the segmented energy storage system or the at least one energy storage system to provide energy flow at the first energy consumer peak power rating, the method comprising: obtaining in a processor of a control system input data representative of the segmented energy storage system comprising at least a first segmented power transmission segment and a second segmented power transmission segment with each segmented power transmission having an energy flow isolation switch in the segmented energy storage system; calculating via the processor an energy flux of each segmented power transmission segment based on an input data of a current sensor and a voltage sensor; calculating via the processor an energy storage charge or discharge rate for each of the at least one energy storage system and energy consumption of each of the at least two energy consumers reference transient predicted energy flux based on an input data including historic data, calendar impact data, environmental data and weather data; calculating via the processor a feedforward variable based on the predicted energy flux of each segmented power transmission segment and an aggregate energy distribution of the each segmented power transmission segment; obtaining in the processor a feedback variable and determining via the processor a control variable based on a multivariable coupled combination of the feedforward variable and a feedback variable based on a real-time current and a real-time voltage for each segmented power transmission segment relative to a maximum current threshold and a maximum voltage threshold of the each segmented power transmission segment; wherein determining the control variable based on the multivariable coupled combination of the feedforward variable and the feedback variable is calculated by a discretized dynamic equation with control of each energy flow isolation switch and the energy storage charge or discharge rate for each of the at least one energy storage system, wherein the discretized dynamic equation comprising feedforward response, feedback response, aggregate energy distribution as a function of time, individual and aggregate stored energy state of each of the at least one energy storage system, open loop scheduled energy consumers, disturbances generated by the open loop scheduled energy consumers; wherein the control system contemporaneously controls operation of the segmented energy storage system based on the control variable.

16. The method of claim 15, further including disturbance rejection to attenuate effects of uncontrolled energy consumers.

17. The method of claim 15, wherein obtaining input data includes obtaining data representative of power generation generators in an interconnected grid or micro-grid.

18. The method of claim 15, wherein calculating a location of the at least one energy storage system relative to either the first segmented power transmission segment or the second segmented power transmission segment.

19. The method of claim 15, wherein calculating a location of the at least one energy storage system relative to an energy consumer of the at least one energy consumer on a same segmented power transmission segment.

20. The method of claim 15 further comprising summing the energy flux of each segmented power transmission segment based on an input data of a current sensor and a voltage sensor and the control variable to provide multivariable feedback control loop dynamic tuning as the control system contemporaneously controls operation of the modular distributed energy system.

* * * * *